(12) United States Patent
Wang et al.

(10) Patent No.: US 10,014,682 B2
(45) Date of Patent: Jul. 3, 2018

(54) PRECISION SURGE CLAMP WITH CONSTANT CLAMPING VOLTAGE AND NEAR-ZERO DYNAMIC RESISTANCE UNDER VARIOUS THERMAL, POWER AND CURRENT LEVELS

(71) Applicant: TEXAS INSTRUMENTS INCORPORATED, Dallas, TX (US)

(72) Inventors: Dening Wang, McKinney, TX (US); Roland Son, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 543 days.

(21) Appl. No.: 14/693,410

(22) Filed: Apr. 22, 2015

(65) Prior Publication Data
US 2015/0303678 A1    Oct. 22, 2015

Related U.S. Application Data
(60) Provisional application No. 61/982,612, filed on Apr. 22, 2014.

(51) Int. Cl.
*H02H 9/00*    (2006.01)
*H02H 9/04*    (2006.01)
*H02H 1/06*    (2006.01)

(52) U.S. Cl.
CPC ............... *H02H 9/04* (2013.01); *H02H 1/06* (2013.01)

(58) Field of Classification Search
CPC ....................................................... H02H 9/04
USPC ............................................................ 361/56
See application file for complete search history.

(56) References Cited

U.S. PATENT DOCUMENTS

| | | | | |
|---|---|---|---|---|
| 5,347,185 A | * | 9/1994 | Tailliet | H01L 27/0251 326/21 |
| 6,940,703 B1 | * | 9/2005 | Kemp | H02H 9/04 361/111 |
| 7,602,022 B2 | * | 10/2009 | Kumagai | H01L 27/0255 257/173 |

* cited by examiner

*Primary Examiner* — Stephen W Jackson
(74) *Attorney, Agent, or Firm* — Lawrence J. Bassuk; Charles A. Brill; Frank D. Cimino

(57) ABSTRACT

A system includes a voltage surge protection circuit that receives a source voltage from a source. The voltage surge protection circuit includes a reference circuit to generate a reference voltage based on the source voltage when the source voltage exceeds a clamping voltage and a feedback control circuit to receive the reference voltage and clamp an output voltage to the clamping voltage when the voltage from the source exceeds the clamping voltage. A dynamic resistance of the feedback control circuit is substantially zero.

18 Claims, 4 Drawing Sheets

PRECISION SURGE CLAMP WITH CONSTANT CLAMPING VOLTAGE AND NEAR-ZERO DYNAMIC RESISTANCE UNDER VARIOUS THERMAL, POWER AND CURRENT LEVELS

CROSS-REFERENCE TO RELATED APPLICATIONS

The present application claims priority to U.S. Provisional Patent Application No. 61/982,612, filed Apr. 22, 2014, titled "Precision Surge Clamp With Constant Clamping Voltage And Near-Zero Dynamic Resistance Under Various Thermal, Power And Current Levels," which is hereby incorporated herein by reference in its entirety.

BACKGROUND

Various electronic devices contain components that are sensitive to voltage surges, for example from a power supply. Typically, surge protectors are employed to ensure that the voltage supplied to a protected electronic device does not exceed a clamping voltage. For certain electronic devices, it may be advantageous to integrate a surge protector with the device to provide protection where another surge protector is not utilized, for example when the electronic device is coupled to a wall socket via a charger. In these instances, it is important that the surge protector have a small form factor so that the size of the electronic device is not unduly increased.

Conventional devices that provide such voltage clamping or protection against surge events include transient voltage suppression (TVS) diodes and voltage regulators realized through analog circuitry. TVS diodes possess a clamping voltage that varies with the current being sunk by the diode; that is, the clamping point for the TVS diode tends to be higher than the trigger voltage for that diode. The slope between the trigger point and the clamping point on a current-voltage plot is referred to as dynamic resistance. It is desirable to reduce dynamic resistance of a clamping device to provide precision with respect to the clamping voltage of that device, regardless of current levels. Analog circuit-based voltage regulators typically provide precise control over clamping voltage, but react (or "turn on") slowly to a TVS event, and thus are likely to fail in the event of a fast edge TVS event. Further, these voltage regulators add a series resistance, which is disadvantageous where the regulation is applied to a power supply input of a device, for example. For these reasons, neither TVS diodes nor analog circuit-based voltage regulators are ideal for TVS clamp applications.

BRIEF DESCRIPTION OF THE DRAWINGS

For a detailed description of various examples, reference will now be made to the accompanying drawings in which.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

Figure 1:
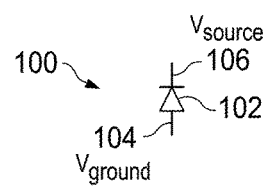
FIG. 1 shows a prior art surge clamp example.

FIG. 1 shows one conventional device 100 that provides voltage clamping or protection against surge events. In particular, FIG. 1 shows a transient voltage suppression (TVS) diode 102. A source voltage is applied across nodes 104, 106 to the TVS diode 102 and the electronic device or circuit being protected is coupled in parallel to the nodes 104, 106 as well. However, the clamping voltage of TVS diode 102 varies with the current being sunk by the diode, and thus the clamping point for TVS diode 102 tends to be higher than the trigger voltage for that diode 102. As explained above, the slope between the trigger point and the clamping point on a current-voltage plot is referred to as dynamic resistance. A voltage clamp that displays such dynamic resistance results in a less-than-ideal surge protection mechanism, since a trigger voltage of the TVS diode 102 must be set below the actual desired system clamping voltage to ensure that in the case of higher-current surge event, the desired clamping voltage is not exceeded.

For example, where a particular electronic device has a working voltage of 15V but an absolute maximum voltage rating of 20V, a TVS diode 102 with a minimum breakdown voltage of 15V would be needed. However, taking into account the variation in breakdown voltage from one diode 102 to another and over a potentially-varying operating temperature range, the TVS diode 102 may have a maximum breakdown voltage of 18V, which allows for only a 2V increase resulting from dynamic resistance inherent to the TVS diode 102. In a situation where, for example, a 50 A surge pulse is possible, a TVS diode 102 having a dynamic resistance of only 40 mΩ is needed, which results in a prohibitively large junction area and corresponding form factor for many applications.

Figure 2:
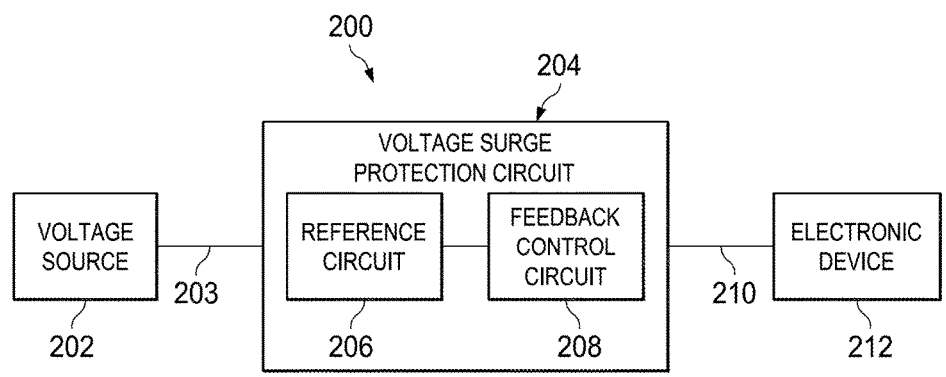
FIG. 2 shows a block diagram of a precision surge clamp in accordance with various examples.

To avoid the above issues, and to provide a more precise surge protection solution, it is desirable to reduce dynamic resistance of a clamping device to provide precision with respect to the clamping voltage of that device, regardless of current levels. Turning now to FIG. 2, a system 200 is shown in accordance with various embodiments. The system 200 includes a voltage source 202, such as a battery, wall charger, or coupling to mains electricity. The voltage source 202 is coupled to an electronic device 212 by way of an intermediate voltage surge protection circuit 204. Interconnects 203, 210 represent connections for power transmission between the voltage source 202, the voltage surge protection circuit 204, and the electronic device 212. Although interconnects 203, 210 are shown as single lines for simplicity, it should be appreciated that these may include a two-wire connection, a three-wire connection, or other known types of connections for power transmission. Further, it should be appreciated that in certain examples, the voltage surge protection circuit 204 is connected in parallel to the electronic device 212 such that a voltage drop across the voltage surge protection circuit 204 is the same as a voltage drop across the electronic device 212.

In accordance with various embodiments, the voltage surge protection circuit 204 includes a reference circuit 206 coupled to a feedback control circuit 208. The reference circuit 206 generates a reference voltage, which is based on a source voltage provided by the voltage source 202. In this way, the reference voltage provided by reference circuit 206 is "powered" by the source voltage delivered by the voltage source 202 and thus does not require any additional power supply. In accordance with various embodiments, the reference circuit 206 generates and provides the reference voltage to the feedback control circuit 208 only when the source voltage provided by the voltage source 202 exceeds a clamping voltage for the system 200. As will be appreciated, the system 200 clamping voltage may be based on particular design parameters related to the electronic device 212. Further, and as will be explained in further detail below, the reference circuit 206 may be designed to provide differing reference voltages based on system 200 requirements.

In accordance with various embodiments, and as will be explained in further detail below the reference voltage provided by the reference circuit 206 is substantially constant even where the source voltage from the voltage source 202 varies. Similarly, the reference voltage provided by the reference circuit 206 is substantially constant even where the reference circuit 206 experiences varying thermal conditions.

The feedback control circuit 208 receives the reference voltage from the reference circuit 206 and, based upon receiving the reference voltage, clamps an output voltage (i.e., the voltage supplied across interconnect 210 to the electronic device 212) to the system 200 clamping voltage. In this sense, the reference voltage generated and provided by the reference circuit 206 may be thought of as turning on and off the functionality of the feedback control circuit 208 to clamp the output voltage provided to the electronic device 212. The feedback control circuit 208 will be explained in further detail below with reference to FIG. 3. However, it should be appreciated that the feedback control circuit 208 is designed to sink an increased amount of current to maintain the output voltage at the clamping voltage when the source voltage provided by voltage source 202 increases above the clamping voltage. Similarly, the feedback control circuit 208 is designed to sink a reduced amount of current to maintain the output voltage at the clamping voltage when the source voltage provided by voltage source 202 decreases above the clamping voltage. In this way, a feedback mechanism based on the source voltage is introduced that allows a precise clamping of the output voltage of the voltage surge protection circuit 204 in varying current and source voltage conditions. Relative to the prior art TVS diode 102, for example, this enables a more precise clamping voltage for the system and reduces dynamic resistance to near-zero levels, all of which will be explained in further detail below. Further, unlike the prior art TVS diode 102 example referred to above, a current conducting element of the voltage surge protection circuit 204 need only be sized to conduct 50 A at 15V, which allows for a higher maximum resistance of 300 mΩ, further enabling a reduced form factor.

Figure 3:
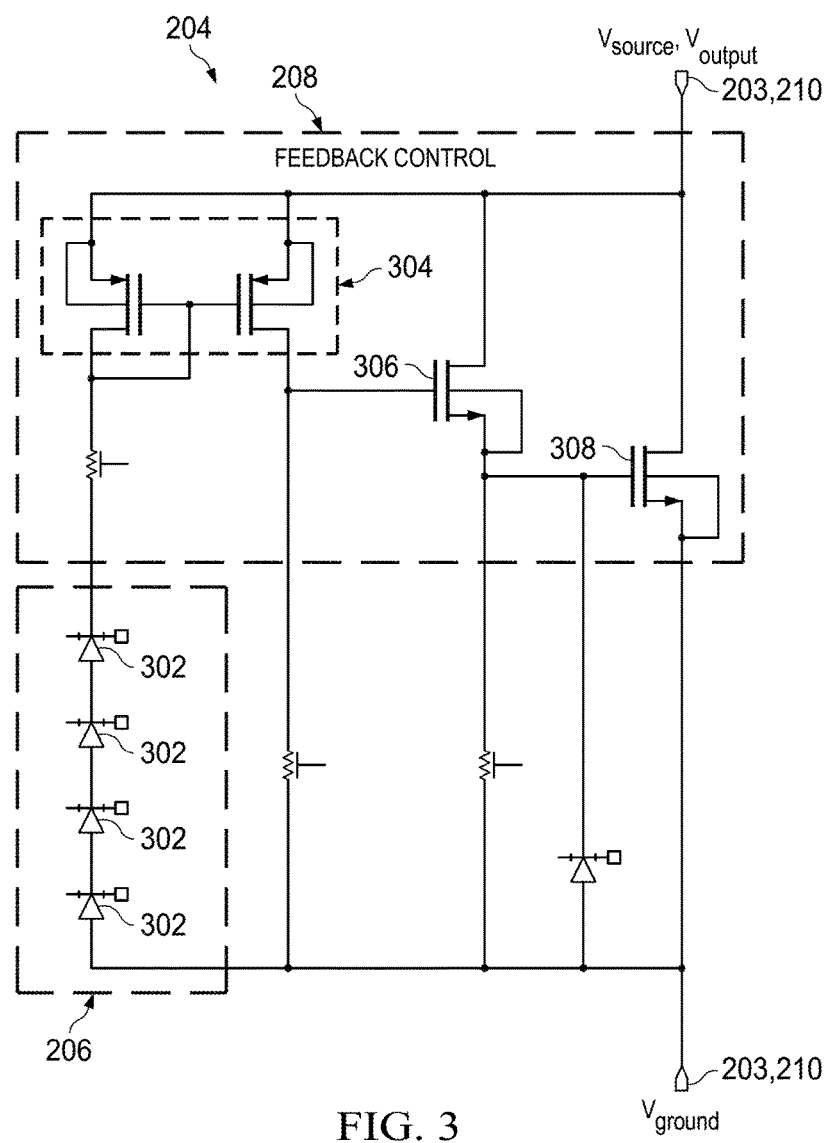
FIG. 3 shows an exemplary circuit diagram of the precision surge clamp in accordance with various examples.

FIG. 3 shows an exemplary schematic of the voltage surge protection circuit 204 in accordance with various embodiments. The voltage surge protection circuit 204 is shown as a two-pin device, in which one pin is shown as being tied to ground, while the source voltage—and corresponding output voltage to the electronic device 212—is supplied to the other pin. As shown in FIG. 3, the reference circuit 206 is implemented as a Zener diode stack 302. The diode stack 302 has a very low temperature coefficient, and thus the reference voltage supplied by the diode stack 302 (i.e., when the source voltage exceeds a breakdown voltage of the diodes) remains steady even where the reference circuit 206 experiences varying thermal conditions. Further, regardless of the source voltage supplied to the voltage surge protection circuit 204, the reference circuit 206 will provide the same reference voltage to the feedback control circuit 208, provided the source voltage exceeds the clamping voltage for the system 200. Of course, the reference circuit 206 may be designed in other manners to provide a steady reference voltage in the event the source voltage exceeds the clamping voltage. For example, the reference circuit 206 may alternately be implemented as a band-gap reference based circuit.

The feedback control circuit 208 is provided with the reference voltage, when generated by the reference circuit 206, by way of exemplary transistor mirror circuit 304. In particular, when the reference circuit 206 does not provide a reference voltage (i.e., where the source voltage has not exceeded the clamping voltage), the gates of the transistor mirror circuit 304 are tied to ground and thus the transistors 304 are turned off. In this off state, the gate of regulating transistor 308 is also tied to ground and thus the regulating transistor 308 is also off.

However, when the reference circuit 206 provides the reference voltage (i.e., where the source voltage has exceeded the clamping voltage), the gates of the transistor mirror circuit 304 are supplied with a voltage and thus the transistors 304 begin to conduct current. As a result of current flowing in the transistor mirror circuit 304, an exemplary buffer transistor 306 is turned on, which in turn pulls up the gate of the regulating transistor 308 to sink current from the source voltage 203 disturbance (i.e., above the clamping voltage) to regulate the output voltage 210 to the clamping voltage.

In accordance with various embodiments, as the source voltage 203 increases, more current is injected into the buffer transistor 306, which in turn further pulls up the gate of the regulating transistor 308 to sink more current from the disturbance 203 to regulate the output voltage 210 to the clamping voltage. Of course, as the source voltage 203 decreases (assuming the source voltage 203 still exceeds the clamping voltage), less current is injected into the buffer transistor 306, which in turn reduces the pull up of the gate of the regulating transistor 308 to sink less current from the disturbance 203 to regulate the output voltage 210 to the clamping voltage. In this way, feedback is enabled to allow for a precise clamping of the output voltage 210 to the desired system 200 clamping voltage regardless of the amount of current being sunk by the regulating transistor 308. As a result, the resulting dynamic resistance of the voltage surge protection circuit 204 is nearly zero. It should be appreciated that the schematic shown in FIG. 3 is exemplary, and other implementations of the reference circuit 206 and the feedback control circuit 208 are within the scope of the present disclosure.

Figure 4:
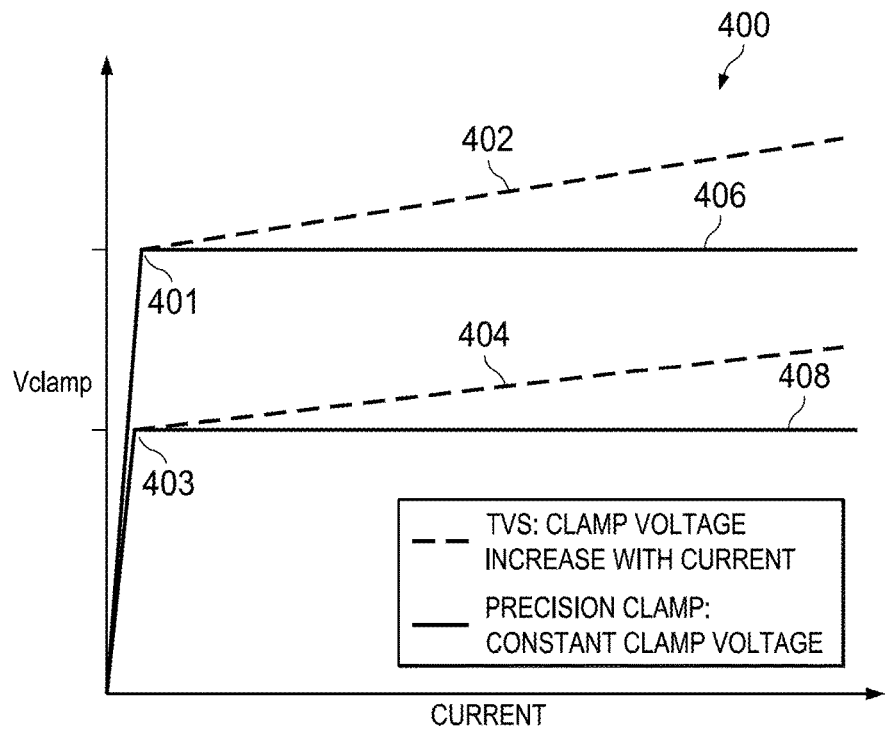
FIG. 4 shows a graph demonstrating a comparison between dynamic resistance of a prior art surge clamp relative to the precision surge clamp in accordance with various examples.

Turning now to FIG. 4, an exemplary current-voltage graph 400 is shown, which demonstrates the differences in dynamic resistance between prior art TVS diode 102 surge protection solutions and the presently disclosed voltage surge protection circuit 204. In a first example, as a source voltage 203 rises a trigger voltage is reached at point 401. At this point, the conventional TVS diode 102 begins to clamp the voltage as shown by the plot 402. However, as explained above, the clamping voltage increases with increasing current, resulting in a positive slope 402 that corresponds to a dynamic resistance of the TVS diode. This introduces both a lack of precision clamping as well as requiring the clamping to be introduced at a lower voltage level than the true clamping voltage to ensure that the output voltage 210 does not exceed a safe level for the electronic device 212 being protected.

By contrast, when the trigger voltage is reached at point 401, the voltage surge protection circuit 204 demonstrates a constant or nearly constant clamping voltage as shown by plot 406. In this case, the clamping voltage varies minimally, if at all, as current sunk by the regulating transistor 308 increases, resulting in a near-zero dynamic resistance. This behavior is enabled by the above-described reference circuit 206, which provides a steady reference voltage when the trigger voltage is reached, combined with the feedback control circuit 208 that modifies the current sunk by the regulating transistor 308 depending on the source voltage 203. This results in a greatly increased clamping precision, where clamping is able to occur much closer to the safe level for the electronic device 212 being protected without concern that the output voltage 210 will exceed that level under increased current conditions. Trigger point 403 and plots 404 and 408 demonstrate similar behavior at a reduced voltage level.

Figure 5:
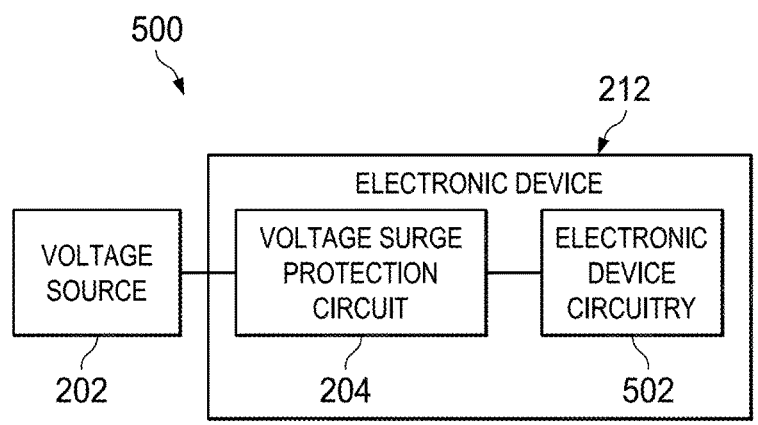
FIG. 5 shows a portable electronic device with an integrated precision surge clamp in accordance with various examples.

Turning now to FIG. 5, another system 500 is shown in accordance with various embodiments. As will be appreciated, one advantage to the above-described voltage surge protection circuit 204 is that a precise clamping voltage is enabled while maintaining a relatively small form factor. As a result of the relatively small form factor, the voltage surge protection circuit 204 is suitable for integration to various electronic devices 212 including mobile phones, tablet computers, and other portable electronic devices 212. Of course, the voltage surge protection circuit 204 is not limited for use with these devices and may be employed in many areas such as industrial environments, automotive environments, consumer environments, and the like.

For exemplary purposes only, assume in FIG. 5 that the electronic device 212 shown is a mobile phone including an input to receive power from the voltage source 202, which may be a standard USB wall charger. As shown, the voltage surge protection circuit 204 is integrated with the mobile phone 212 and connected in parallel to the mobile device circuitry 502 (e.g., processing devices, memory devices, and other such functional elements utilized to provide functionality of the electronic device 212). In some instances, due to cable inductance of the wall charger 202 or discrete inductors built into the wall charger 202, a large overvoltage event or transient may occur when there is an interruption to the current to the wall charger 202. Since a discrete surge protector may not necessarily be present in the system 500, the integrated voltage surge protection circuit 204 is thus responsible for clamping the overvoltage event to the specified clamping voltage to minimize the risk of damage to the mobile phone circuitry 502.

As explained above, the inclusion of a feedback control circuit 208 in the integrated voltage surge protection circuit 204 results in greatly increased precision of clamping voltage at varying current levels. Further, since the reference circuit 206 and the feedback control circuit 208 both function based on the source voltage from the voltage source 202, no additional power supply is required which reduces the overall complexity of incorporating the voltage surge protection circuit 204 with various types of electronic devices 212. Further, the use of the feedback control circuit 208 allows the resistance of the regulating transistor 308 to be adjusted according to the current level of the surge event, which allows the regulating transistor 308 to be sized for the maximum current consumption required.

Figure 6A:
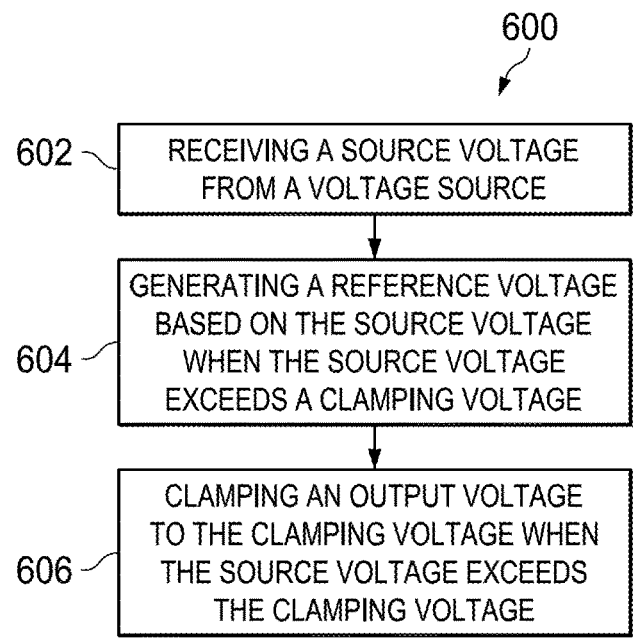
FIGS. 6a and 6b show flow charts of a method in accordance with various examples.

FIG. 6a shows a flow chart of a method 600 in accordance with various embodiments. The method 600 begins in block 602 with receiving a source voltage from voltage source. For example, a voltage surge protection device 204 may be coupled to a voltage source 202 in parallel and thus receives the provided source voltage. The method 600 continues in block 604 with generating a reference voltage based on the source voltage when the source voltage exceeds a clamping voltage. As explained above, an exemplary reference circuit 206, such as a diode stack, may be designed such that upon the source voltage exceeding the system clamping voltage, the reference circuit 206 generates a reference voltage (e.g., based on the breakdown voltage value of the diodes in the stack). The reference voltage is typically generated and provided by the reference circuit 206 only when the source voltage provided by the voltage source 202 exceeds a clamping voltage for the system.

In accordance with various embodiments, the reference voltage provided by the reference circuit 206 is substantially constant even where the source voltage from the voltage source 202 varies. Similarly, the reference voltage provided by the reference circuit 206 is substantially constant even where the reference circuit 206 experiences varying thermal conditions.

The method 600 further continues in block 606 with clamping an output voltage to the clamping voltage when the source voltage exceeds the clamping voltage. In particular, a feedback control circuit 208 receives the reference voltage from the reference circuit 206 and, based upon receiving the reference voltage, clamps an output voltage (i.e., the voltage supplied to an electronic device 212 being protected) to the system clamping voltage. Thus, the provided reference voltage turns on and off the functionality of clamping the output voltage provided to the electronic device 212.

Figure 6B:
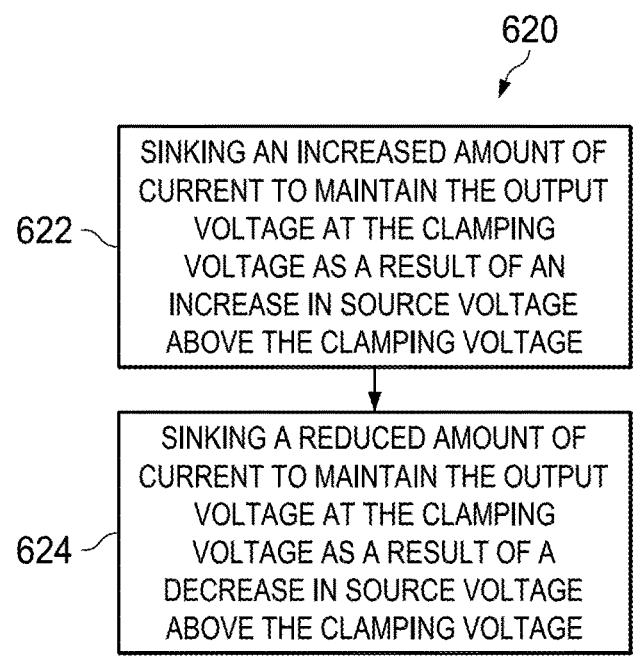

Turning now to FIG. 6b, additional, optional steps are shown in method 620. The method 620 begins in block 622 with sinking an increased amount of current to maintain the output voltage at the clamping voltage as a result of an increase in source voltage above the clamping voltage. Further, the method 620 continues in block 624 with sinking a reduced amount of current to maintain the output voltage at the clamping voltage as a result of a decrease in source voltage above the clamping voltage. As explained above, particularly with respect to FIG. 3, the feedback control circuit 208 varies the operation of its regulating transistor 308 to maintain a precise clamping of the output voltage of the voltage surge protection circuit 204 in varying current and source voltage conditions. Relative to the prior art TVS diode 102, for example, this enables a more precise clamping voltage for the system and reduces dynamic resistance to near-zero levels.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a voltage surge protection circuit configured to receive a source voltage from a source, the voltage surge protection circuit including:
a reference circuit configured to generate a reference voltage based on the source voltage when the source voltage exceeds a clamping voltage; and
a feedback control circuit configured to receive the reference voltage and clamp an output voltage to the clamping voltage when the voltage from the source exceeds the clamping voltage, wherein a dynamic resistance of the feedback control circuit is substantially zero:
in which an increase in the source voltage above the clamping voltage causes the feedback control circuit to sink an increased amount of current to maintain the output voltage at the clamping voltage; and
a decrease in the source voltage above the clamping voltage causes the feedback control circuit to sink a reduced amount of current to maintain the output voltage at the clamping voltage.

2. The system of claim 1 in which the reference voltage generated by the reference circuit is substantially constant when the source voltage varies.

3. The system of claim 1 in which the reference voltage generated by the reference circuit is substantially constant when a current sank by the feedback control circuit varies.

4. The system of claim 1 in which the reference voltage generated by the reference circuit is substantially constant in varying thermal conditions.

5. The system of claim 1 in which the feedback control circuit comprises a transistor mirror circuit coupled to a regulating transistor and wherein current flows through the transistor circuit when the reference circuit generates the reference voltage.

6. The system of claim 5 in which the reference circuit comprises a diode stack.

7. The system of claim 1 in which the voltage surge protection circuit is a two-pin device.

8. The system of claim 1 including a portable electronic device, in which the voltage surge protection circuit is in parallel with the portable electronic device.

9. A method comprising:
receiving, by a voltage surge protection device, a source voltage from a voltage source;
generating, by a reference circuit, a reference voltage based on the source voltage when the source voltage exceeds a clamping voltage;
based on the reference voltage being received by a feedback control circuit, clamping, by the feedback control circuit, an output voltage to the clamping voltage when the source voltage exceeds the clamping voltage;
sinking, by the feedback control circuit, an increased amount of current to maintain the output voltage at the clamping voltage as a result of an increase in the source voltage above the clamping voltage; and
sinking, by the feedback control circuit, a reduced amount of current to maintain the output voltage at the clamping voltage as a result of a decrease in the source voltage above the clamping voltage.

10. The method of claim 9 in which the reference voltage is substantially constant when the source voltage varies.

11. The method of claim 9 in which the reference voltage is substantially constant when a current sank by the feedback control circuit varies.

12. The method of claim 9 in which the reference voltage is substantially constant in varying thermal conditions.

13. The method of claim 9 in which the feedback control circuit includes a transistor mirror circuit coupled to a regulating transistor and in which current flows through the transistor circuit when the reference circuit generates the reference voltage.

14. The method of claim 13 in which the reference circuit comprises a diode stack.

15. The method of claim 9 in which the steps are carried out by a two-pin device.

16. A portable electronic device comprising:
device circuitry;
a power input to receive a source voltage; and
a voltage surge protection circuit coupled in parallel to the power input and the device circuitry, the voltage surge protection circuit including:
a diode stack that generates a reference voltage based on the source voltage when the source voltage exceeds a clamping voltage; and
a transistor mirror circuit that receives the reference voltage and causes a buffer transistor to drive the gate of a regulating transistor to clamp an output voltage to the clamping voltage when the voltage from the source exceeds the clamping voltage, in which a dynamic resistance of the regulating transistor is substantially zero.

17. The portable electronic device of claim 16 in which: an increase in the source voltage above the clamping voltage causes the regulating transistor to sink an increased amount of current to maintain the output voltage at the clamping voltage; and a decrease in the source voltage above the clamping voltage causes the regulating transistor to sink a reduced amount of current to maintain the output voltage at the clamping voltage.

18. The portable electronic device of claim 16 in which the reference voltage generated by the diode stack is substantially constant in varying thermal conditions.

* * * * *